(12) United States Patent
Howell et al.

(10) Patent No.: US 6,443,574 B1
(45) Date of Patent: Sep. 3, 2002

(54) REMOVABLE VEHICLE ENTERTAINMENT SYSTEM

(75) Inventors: Brian Reece Howell, Lake Orion; Christopher Eugene Andrews, South Lyon; John Michael Dicky, Dearborn; Stephen Wayne Hoffman, Riverview; Sachin V. Shah, Troy; Thomas Norfork, Jr., Southfield, all of MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/912,104

(22) Filed: Jul. 24, 2001

(51) Int. Cl.7 .............................................. G03B 21/00
(52) U.S. Cl. ............................ 353/13; 353/72; 345/649
(58) Field of Search ...................... 353/13, 72; 345/649

(56) References Cited

U.S. PATENT DOCUMENTS

| | | | |
|---|---|---|---|
| 4,961,641 A | * | 10/1990 | Segal et al. ................ 353/27 R |
| 5,136,127 A | | 8/1992 | Blair |
| 5,281,985 A | * | 1/1994 | Chan ............................ 353/13 |
| 5,461,437 A | | 10/1995 | Tanaka et al. |
| 5,621,458 A | | 4/1997 | Mann et al. |
| 5,664,859 A | | 9/1997 | Salerno et al. |
| 5,986,634 A | * | 11/1999 | Alioshin et al. ............. 345/649 |
| 6,042,414 A | * | 3/2000 | Kunert ........................ 439/374 |
| 6,061,233 A | | 5/2000 | Jung |
| 6,082,864 A | * | 7/2000 | Rodriguez, Jr. et al. ...... 353/87 |

* cited by examiner

*Primary Examiner*—Russell Adams
*Assistant Examiner*—Michelle Nguyen
(74) *Attorney, Agent, or Firm*—Brinks Hofer Gilson & Lione

(57) ABSTRACT

A removable vehicle entertainment system is provided. The system includes a video display screen for displaying entertainment to an occupant of the vehicle. The system can be removed from the docking bracket in the vehicle, and attached to an external docking station such that the system can be used independently of the power supply and speakers of the vehicle. Further, the system can be used as a self-contained personal entertainment system. The system includes mechanical and/or electrical componentry that determines the orientation of the video display screen, and allows the electronics of the system to display an image on the screen in an appropriate orientation, thus avoiding upside-down images in the various uses of the system.

7 Claims, 4 Drawing Sheets

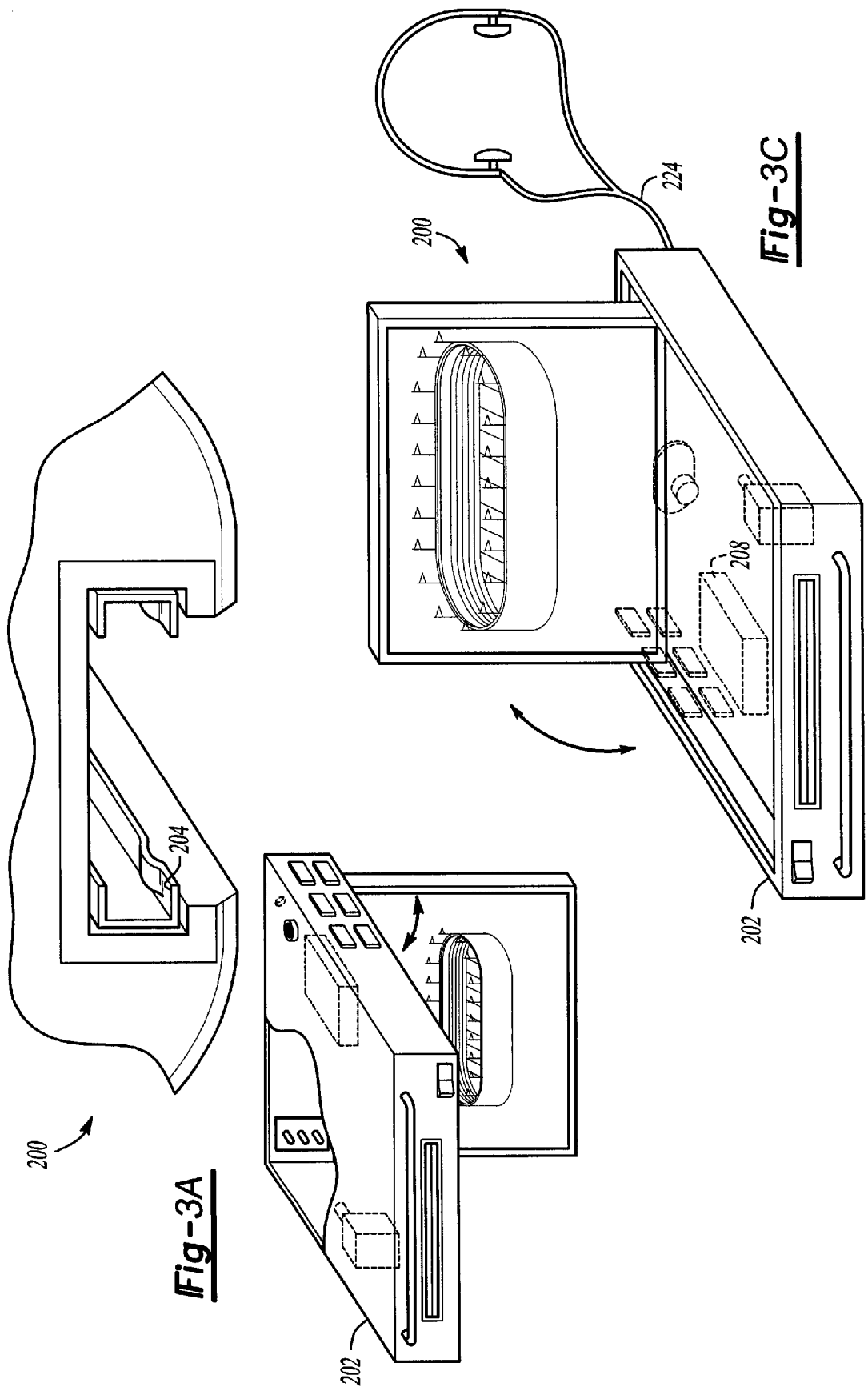

REMOVABLE VEHICLE ENTERTAINMENT SYSTEM

FIELD OF THE INVENTION

The present invention relates to in-vehicle entertainment devices. More specifically, the present invention relates to removable entertainment devices that can be used as a stand alone device, and shuttled between a docking bracket in a vehicle and an external docking bracket.

BACKGROUND OF THE INVENTION

Recent advances in telematics have allowed for the incorporation of video entertainment systems into vehicles. Roof mounted video screens provide an example of such an entertainment system. Typically, the video screen is stored in a housing that is secured to the roof of the vehicle and can be flipped downward when an occupant of the vehicle desires to view the screen. The system displays images from an attached videocassette drive or other device onto the video screen, allowing vehicle occupants to view prerecorded video inside the vehicle.

The owners of such vehicles may have similar video equipment attached to a home entertainment system or may even have a portable entertainment system for use away from the home and outside of the vehicle. Consequently, the in-vehicle video entertainment system can be duplicative of other equipment possessed by the vehicle owner. This results in increased entertainment expenses for the vehicle owner.

SUMMARY OF THE INVENTION

The present invention provides an in-vehicle entertainment system that can be removed from the vehicle. The system is secured in the vehicle by a vehicle docking bracket attached to the vehicle, preferably to the roof of the vehicle. Thus, when in the vehicle, a video display screen preferably extends downward from the housing of the system. When removed from the vehicle, however, downward extension of the video display screen can make viewing images on the screen difficult. Positioning the system such that the video display screen extends upward from the housing when removed from the vehicle docking bracket facilitates use of the system outside of the vehicle.

To avoid the display of upside down images on the video display screen, electronics of the system are able to display images in at least two orientations. A first orientation presents the image in a manner suitable for use in the vehicle, i.e., when the screen extends downward from the housing. A second orientation presents the image in a manner suitable for use outside of the vehicle, i.e., when the screen extends upward from the housing. A mechanical switch or electrical circuit is employed to determine which orientation is appropriate for a given use of the system. Based on the status of the switch or electrical circuit, the electronics display images on the screen in the appropriate orientation.

In one embodiment, the system comprises an information retrieval device, such as a DVD drive, a video display screen, a mechanical switch, electronics capable of retrieving information from the information retrieval device and displaying an appropriate image on the screen, a housing, and at least one vehicle docking bracket. The vehicle docking bracket preferably provides appropriate electrical connections to the system when the housing is received by the docking bracket. Also, the electronics display images on the screen in an appropriate orientation based upon the status of the switch.

In a second preferred embodiment, an electrical circuit replaces the mechanical switch. Similar to the first embodiment, electronics display images on the screen in an appropriate orientation based upon the status of the electrical circuit.

The present invention also provides a mobile entertainment system for at least part-time use in a vehicle. The mobile system comprises the components of the removable entertainment system, and preferably further comprises at least one external docking bracket for receiving the housing when it is not seated in the vehicle docking bracket. In contrast to the vehicle docking bracket, the external docking bracket positions the housing such that the display screen extends upward from the housing. The external docking bracket can comprise a docking station, which includes connections to external speakers and a power supply. Also, the removable system can include an internal power supply, such as a battery, and an integrated audio output so that the system can be used independently of any docking bracket.

DETAILED DESCRIPTION OF THE PREFERRED EMBODIMENTS OF THE INVENTION

The following description of preferred embodiments of the invention provides examples of the present invention. The embodiments discussed herein are merely exemplary in nature, and are not intended to limit the scope of the invention in any manner. Rather, the description of these preferred embodiments serves to enable a person of ordinary skill in the relevant art to make and use the present invention.

Figure 1:
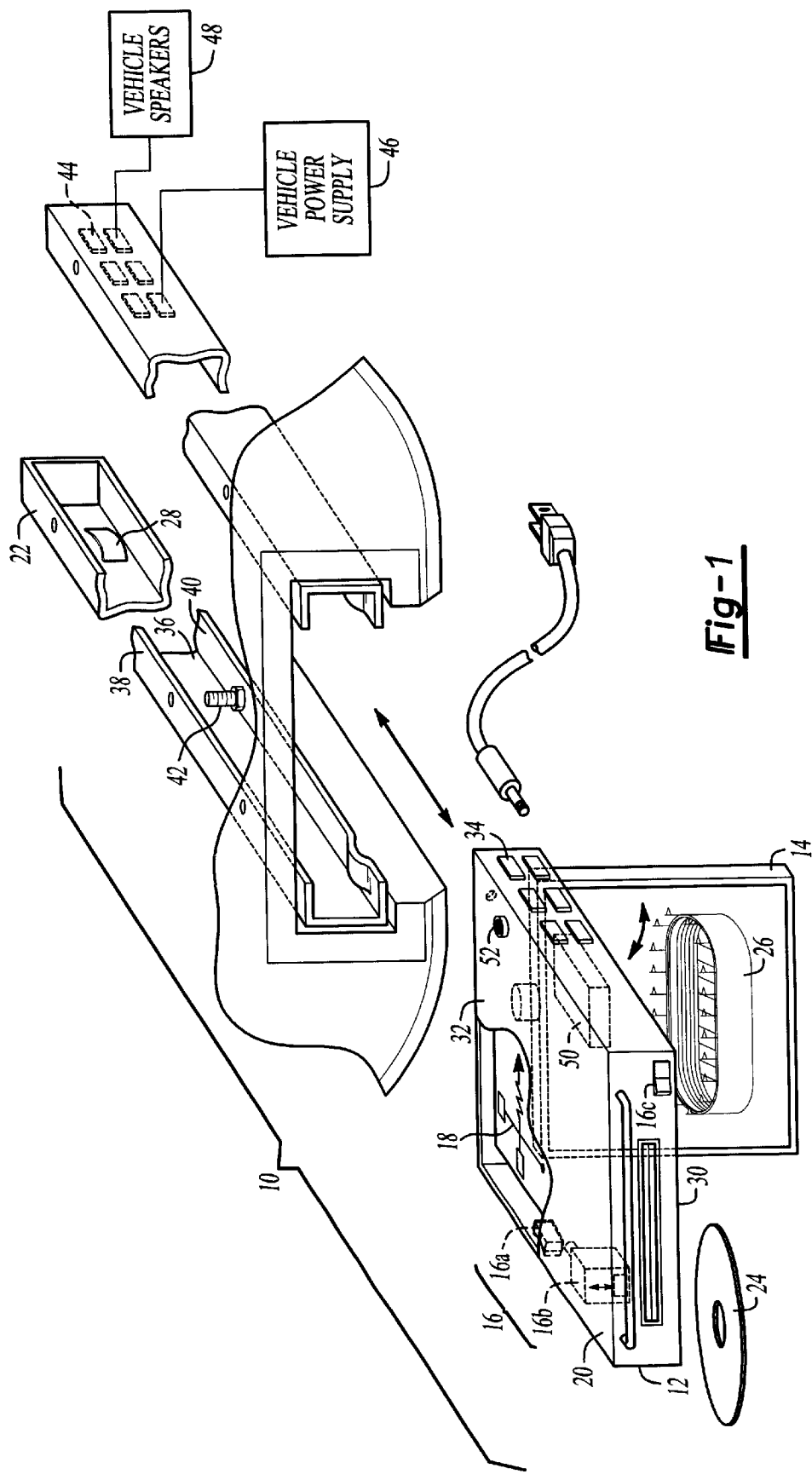
FIG. 1 is a perspective view of a first preferred embodiment of a removable entertainment device in accordance with the present invention.

FIG. 1 illustrates a removable entertainment device, generally indicated in the figures at reference 10, in accordance with a first preferred embodiment of the present invention. The removable entertainment device 10 includes an information retrieval device 12, a video display screen 14, a mechanical switch 16, electronics 18, a housing unit 20, and at least one vehicle docking bracket 22. The video display screen 14 is preferably pivotally mounted to the housing 20 such that the display screen 14 can be pivoted away from the housing 20 when viewing is desired and toward the housing 20 when storage of the screen 14 is desired. The vehicle docking bracket 22 releasably receives the housing unit 20.

The information retrieval device 12 is preferably a component that is capable of receiving a removable storage medium 24 and reading entertainment information stored on the medium 24. Particularly preferable, the information retrieval device 12 comprises a component capable of receiving and reading a standard type of storage media. As illustrated in the figure, the information retrieval device 12 preferably comprises a DVD (digital video disk) drive. In this embodiment, the removable or fixed storage medium 24 comprises a DVD. Alternatively, the information retrieval device 12 can comprise a compact disk (CD) drive, a CD-ROM drive, a removable or fixed hard drive, a videocassette drive, or any other suitable component. The removable storage medium 24 will of course be appropriate for the type of information retrieval device 12 utilized.

The video display screen 14 comprises the output device of the removable entertainment device 10. As such, the screen 14 displays images 26 based on information contained on the removable storage medium 24 as read by the information retrieval device 12. The type of video display screen 14 employed will depend on the desired resolution and picture quality. LCD screens, such as those used in portable computers and personal entertainment systems, are suitable.

Because a portion of the entertainment device 10 can be removed from the vehicle docking bracket 22, it is not necessary that the device 10 always be used in an orientation in which the screen 14 extends down from the housing unit 20. While this orientation will of course be desirable when the entertainment device 10 is positioned within the vehicle docking bracket 22, it will most likely not be desirable when the device 10 is removed from the bracket 22. Rather, a reverse orientation in which the screen 14 extends upward from the housing unit 20 is desired in this instance. To avoid the display of the image 26 in an upside down orientation, the removable entertainment device 10 includes mechanical switch 16.

The mechanical switch 16 provides an actuator that, in conjunction with the electronics 18, controls the orientation of the image 26 on the video display screen 14. The mechanical switch 16 preferably comprises a two position switch 16a. The first position represents an activated status, while the second position represents an inactivated status. Any suitable mechanical switch can be utilized. FIG. 1 illustrates two alternatives for the mechanical switch 16a, 16b. Preferably, the mechanical switch 16a is positioned such that it interacts with a projection 28 on the vehicle docking bracket. In this embodiment, projection 28 forces the switch 16a into the first position, or activated status, when the housing unit 20 is fully received by the vehicle docking bracket 22. As will be developed more fully below, the activated status of the switch 16 in this embodiment instructs the electronics 18 to display the image 26 on the video display screen 14 in an orientation appropriate for the screen 14 as it extends downward from the housing unit 20. When the housing unit 20 is removed from the vehicle docking bracket 22, the projection 28 forces the switch 16a into the second position, or inactivated status, which instructs the electronics 18 to display the image 26 on the screen 14 in an orientation appropriate for the screen 14 as it extends upward from the housing unit 20.

Alternatively, the switch 16 can comprise a gravity switch 16b. Any suitable gravity or tilt activated switch can comprise the gravity switch. U.S. Pat. No. 5,136,127 to Blair for a TILT ACTUATED SWITCH provides background and examples of suitable switches. In this embodiment, the gravity switch 16b is positioned such that it is able to detect the orientation of a first surface 30 of the housing unit 20 with respect to gravitational forces. Preferably, the gravity switch 16b is positioned such that the switch 16b is in the first position, or activated status, when the first surface 30 is facing downward. That is, it is preferred that the gravity switch 16b is positioned such that the switch 16b is activated when the removable entertainment device 10 is positioned such that the video display screen 14 extends downward from the housing 20 when viewing of the image 26 is desired, such as when the housing 20 is received by the vehicle docking bracket 22. Also preferable, the gravity switch 16b is positioned such that the switch 16b is in the second position, or unactivated status, when a second surface 32, which lies opposite the first surface 30, is facing downward.

Alternatively, the switch 16 can comprise a button 16c or other control that allows an occupant of the vehicle to manually activate switch 16. For example, as illustrated in FIG. 1, the switch can comprise a button 16c positioned on the housing unit 20 that allows a vehicle occupant to control activation of the switch 16, and therefore orientation of the image 26, by depressing the button 16c.

The electronics 18 are adapted to read the information stored on the removable storage medium 24 and to display an image 26 based on this information onto the video display screen 14. As such, suitable electronics 18 include those typically utilized in the type of information retrieval device 12 employed in the removable entertainment device 10.

Electronics 18 are further adapted to display the image 26 onto the video display screen 14 in at least two different orientations. Preferably, each orientation represents a 180 degree rotation of the other orientation. As discussed above, the electronics 18 preferably detect the status of the switch 16 to determine which orientation is appropriate for display on the screen 14.

Electronics 18 also preferably include terminals 34 that allow the electronics 18 to interact with external electrical components, which will be developed more fully below.

The housing unit 20 contains the information retrieval device 12 and the electronics 18. Preferably, the housing unit 20 encases the information retrieval device 12 and electronics 18 while still allowing the information retrieval device 12 to receive a removable storage medium 24 and the terminals 34 of the electronics 18 to interact with external electrical components. Further, the housing unit 20 preferably mounts the video display screen 14 in a manner that allows the screen 14 to pivot between first and second positions. In the first position, the screen 14 is preferably positioned directly adjacent the housing 20 such that the image 26 cannot be viewed on the screen. In a second position, the screen 14 is preferably positioned substantially perpendicular to the length of the housing 20 such that the image 26 can be optimally viewed. Any suitable structural interaction between the housing 20 and video display screen 14 that achieves this pivotal relationship can be utilized.

The vehicle docking bracket 22 is able to releasably receive the housing unit 20. Preferably, as illustrated in FIG. 1, the vehicle docking bracket 22 comprises a rail structure having a base 36 and two opposing arms 38, 40. In this embodiment, the opposing arms 38, 40 cooperatively receive and retain the housing unit 20 by allowing the housing unit 20 to slide between the arms 38, 40. Alternatively, the vehicle docking bracket 22 can comprise any structure capable of releasably receiving the housing unit 20.

The vehicle docking bracket 22 also preferably contains fasteners 42 for attaching the bracket 22 to the vehicle, such as at the roof or ceiling of the vehicle.

As illustrated in FIG. 1, the vehicle docking bracket 22 preferably defines one or more electrical connectors 44 that are in electrical communication with at least a power supply 46 and, either directly or indirectly, one or more speakers 48 of the vehicle. Preferably, the electrical connectors 44 comprise conductive flanges defined by the docking bracket 22.

Alternatively, the electrical connectors 44 can comprise terminals of a pigtail connector or other suitable connector passed through an opening defined by the bracket 22.

Preferably, the electrical connectors 44 are positioned such that they are able to frictionally engage the terminals 34 of the electronics 18 as the housing unit 20 is received by the vehicle docking bracket 22. Also preferable, the electrical connectors 44 and terminals 34 are in electrical communication with each other, thereby placing the electronics 18 in electrical communication with the power supply 46 and vehicle audio system 48, when the housing unit 20 is fully received by the vehicle docking bracket 22.

When the housing unit 20 is not seated in the vehicle docking bracket, the removable entertainment device 10 is preferably capable of acting as a selfcontained entertainment device. Accordingly, the removable entertainment device 10 can further include an internal power supply 50 and an audio output component 52. The internal power supply 50 can comprise any suitable power supply, such as a rechargeable battery. Also, the audio output component 52 can comprise any suitable audio output device, such as a wired ready jack or wireless headphone transmitter, an internal speaker, or a speaker jack.

Figure 2:
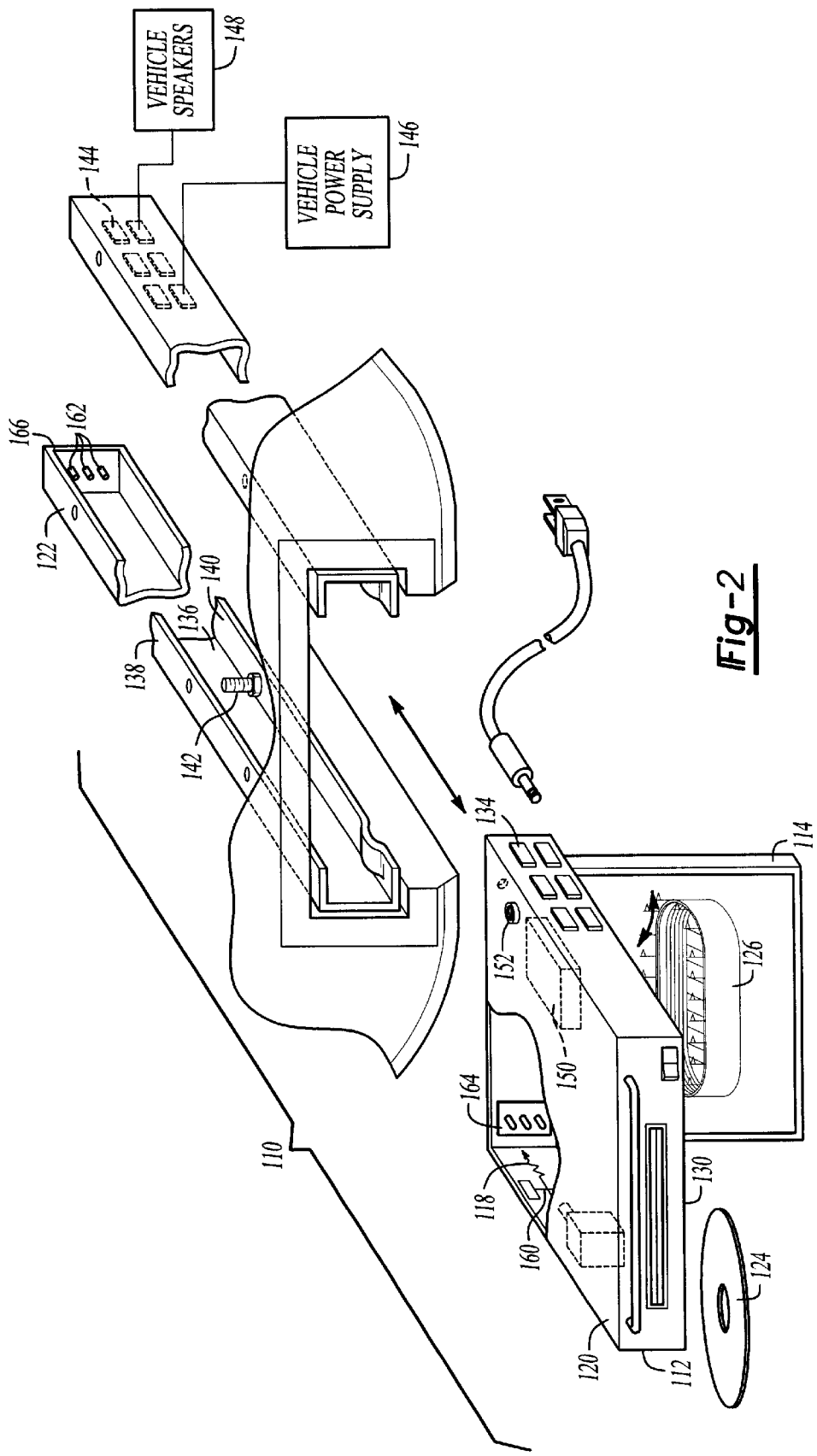
FIG. 2 is a perspective view of a second preferred embodiment of a removable entertainment device in accordance with the present invention.

FIG. 2 illustrates a second preferred embodiment of the present invention. In the figure, like reference numbers refer to similar features and/or components illustrated in FIG. 1. Accordingly, removable entertainment device 110 according to this embodiment includes an information retrieval device 112, a video display screen 114, electronics 118, a housing unit 120, a vehicle docking bracket 122, a removable storage medium 124, a first surface 130, a second surface 132, and electronic terminals 134. The bracket 122 preferably includes rail structures having a base 136 and two opposing arms 138,140. Fasteners 142 are used to attach bracket 122 to a vehicle. One or more electrical connectors 144 are in electrical communication with at least a power supply 146 and, either directly or indirectly, one or more speakers 148 of the vehicle. The removable entertainment device 110 may also include an internal power supply 150 and an audio output component 152. Also, the second preferred embodiment is similar to the first preferred embodiment detailed above, except as described below.

The removable entertainment device 110 according to the second preferred embodiment does not include a mechanical switch. Rather, the device 110 includes an electrical circuit 160 that detects whether the housing unit 120 is received by the vehicle docking bracket 122. That is, the electrical circuit 160 is adapted to detect the presence of the housing unit 120 within the vehicle docking bracket 122.

Preferably, the docking bracket includes one or more pins 162 to interact with a port 164 in communication with the electrical circuit 160. The pins 162 are preferably in electrical communication with a power supply and provide an electrical signal to the electrical circuit 160 when the pins 162 are in contact with the port 164. Preferably, the pins 162 are part of a multipin electrical connector 166. Alternatively, a single pin 162 can be utilized. When an electrical signal is provided to the electrical circuit 160 by the pins 162, the electronics 118 preferably display the image 126 in an orientation appropriate for use with the vehicle docking bracket 122, as described above. When either no signal or an alternate signal is detected, the electronics 118 preferably display the image 126 in an opposite orientation.

Alternatively, the electrical circuit 160 can be adapted to determine the voltage of the power supply to which the electrical circuit 160 is connected. In this embodiment, the electrical circuit 160 preferably determines whether the circuit 160 is connected to a power supply appropriate for a vehicle. For example, in an automobile, the electrical circuit 160 preferably determines if the circuit 160 is connected to a 12 V automotive battery. If such voltage is present, electronics 118 preferably display the image 126 in an orientation appropriate for use with the vehicle docking bracket 122. If a different voltage is detected, the electronics 118 preferably display the image 126 in an opposite orientation.

FIG. 3 illustrates a mobile entertainment system 200 in accordance with the present invention. The mobile entertainment system 200 includes a removable entertainment device 202 and a vehicle docking bracket 204. Preferably, the mobile entertainment system 200 further includes an external docking bracket 206 and an internal power supply 208.

The removable entertainment device 202 is preferably a device in accordance with either the first or second preferred embodiment, as detailed above. Further, the vehicle docking bracket 204 is preferably in accordance with either the first or second preferred embodiment. As illustrated in FIG. 3A, the mobile entertainment system 200 can be used in accordance with the first and second preferred embodiments in a vehicle.

Figure 3B:
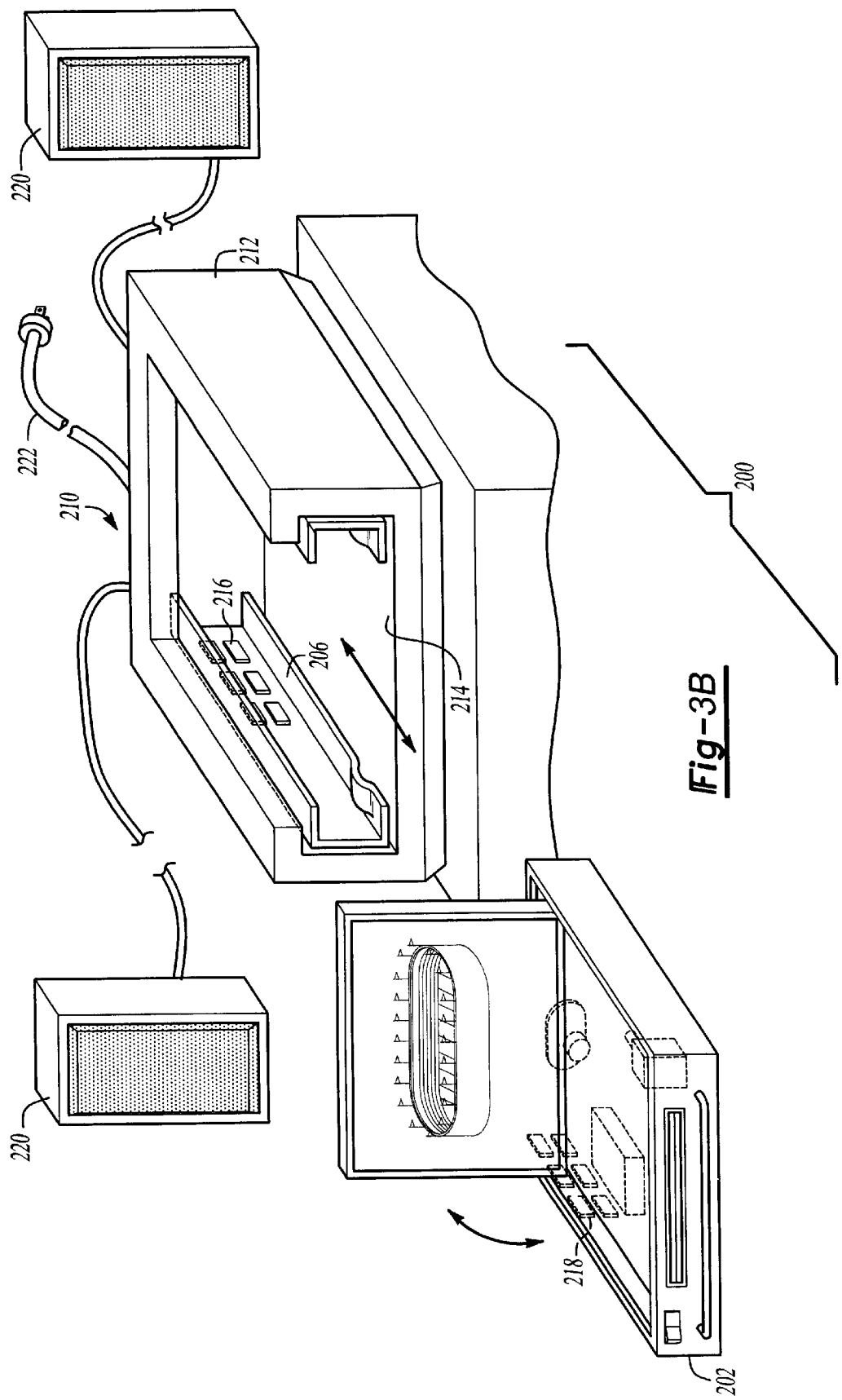
FIG. 3 presents a series of perspective views of a mobile entertainment system in accordance with the present invention. Panel A illustrates the use of the system in a vehicle. Panel B, illustrates the use of the system in conjunction with an external docking station. Panel C illustrates the use of the system as a personal, self-contained entertainment system.

As illustrated in FIG. 3B, the external docking bracket 206 preferably comprises a docking station 210. As such, the external docking bracket 206 preferably comprises a bracket similar to the vehicle docking bracket 204 that is mounted within a docking station housing 212. The docking station housing 212 preferably defines a recess 214 that receives the removable entertainment device 202. Also preferable, the docking station 210 preferably includes connectors 216 that interact with ports 218 on the removable entertainment device 202 in a manner that establishes electrical communication between the removable entertainment device 202 and speakers 220 attached to the docking station 210 and an external power supply 222.

As illustrated in FIG. 3C, the removable entertainment device 202 can preferably be used as a self-contained personal entertainment system. Accordingly, the removable entertainment device 202 preferably includes an internal power supply 208 and an audio output component 224 similar to that described above.

It should be noted that the first and second orientations of the image on the video display screen can alternatively be based upon activated or inactivated status of the mechanical switch or presence or absence of electrical signal across the electrical circuit.

The foregoing disclosure is the best mode devised by the inventors for practicing the invention. It is apparent, however, that several variations in accordance with the present invention may be conceivable to one of ordinary skill in the relevant art. Inasmuch as the foregoing disclosure is intended to enable such person to practice the instant invention, it should not be construed to be limited thereby, but should be construed to include such aforementioned variations. As such, the present invention should be limited only by the spirit and scope of the following claims.

What is claimed is:

1. A mobile entertainment system for part-time use in a vehicle having a power supply and an audio system, said entertainment system comprising:

an information retrieval device capable of receiving a storage medium;

a housing unit containing said information retrieval device;

a video display screen pivotally mounted to said housing unit;

electronics having one or more terminals and adapted to retrieve information from said storage medium and to selectively display an image based on said information onto said video display screen in first and second orientations, said electronics including an audio output, a first docking bracket adapted to be mounted to said vehicle and further adapted to releasably receive said housing unit such that said video display screen is capable of extending downward from said housing unit and further adapted to provide electrical communication between said power supply and said audio system and said one or more terminals when said housing is received by said first docking bracket;

at least one external speaker; and a second docking bracket adapted to releasably receive said housing unit and adapted to provide electrical communication between said audio output and said at least one external speaker;

wherein said image is displayed on said video display screen in said first orientation when said housing unit is received by said first docking bracket and in said second orientation when said housing unit is received by said second docking bracket.

2. The mobile entertainment system of claim 1, further comprising a battery adapted to provide electrical power to said mobile entertainment system when said housing unit is not received by said first docking bracket.

3. The mobile entertainment system of claim 1, further comprising a switch adapted to selectively output first and second signals;

wherein said switch outputs said first signal when said housing unit is received by said first docking bracket and said switch outputs said second signal when said housing unit is received by said second docking bracket.

4. The mobile entertainment system of claim 3, wherein said switch comprises a mechanical switch adapted to move between first and second positions and wherein said switch outputs said first signal when in said first position and outputs said second signal when in said second position.

5. The mobile entertainment system of claim 4, wherein said switch comprises a gravity switch adapted to detect the orientation of a first surface of the housing unit with respect to the earth, such that said switch is in said first position when said first surface is facing the earth and said switch is in said second position when a second surface of said housing unit is facing the earth.

6. The mobile entertainment system of claim 1, further comprising an electrical circuit adapted to detect whether said housing unit is received by either said first or said second docking bracket.

7. The mobile entertainment system of claim 6, wherein said electrical circuit is adapted to determine that said housing unit is received by said first docking bracket by detecting an electrical connection to said power supply of said vehicle.

* * * * *